United States Patent [19]
Tozu et al.

[11] Patent Number: 6,078,858
[45] Date of Patent: Jun. 20, 2000

[54] VEHICLE MOTION CONTROL SYSTEM

[75] Inventors: Kenji Tozu, Yokkaichi; Takayuki Itoh, Nagoya; Norio Yamazaki, Kariya, all of Japan

[73] Assignee: Aisin Seiki Kabushiki Kaisha, Kariya, Japan

[21] Appl. No.: 09/009,313

[22] Filed: Jan. 20, 1998

[30] Foreign Application Priority Data

Jan. 20, 1997 [JP] Japan ................................ 9-022042

[51] Int. Cl.⁷ ........................................................ G06F 7/00
[52] U.S. Cl. ........................... 701/79; 701/78; 701/71; 303/146; 303/147
[58] Field of Search ................................ 701/70, 71, 72, 701/75, 78, 79, 82; 303/146, 122.05, 147, 155, 163, 166, 174, 188, 140, 121, 198, 196; 318/586, 587

[56] References Cited

U.S. PATENT DOCUMENTS

| | | | |
|---|---|---|---|
| 4,898,431 | 2/1990 | Karnopp et al. | 303/100 |
| 5,161,865 | 11/1992 | Higashimata et al. | 303/115.2 |
| 5,505,532 | 4/1996 | Tozu et al. | 303/198 |
| 5,620,239 | 4/1997 | Mihara et al. | 303/121 |
| 5,694,321 | 12/1997 | Eckert et al. | 701/70 |
| 5,752,752 | 5/1998 | Tozu et al. | 303/146 |
| 5,762,406 | 6/1998 | Yasui et al. | 303/146 |
| 5,826,951 | 10/1998 | Sano | 303/146 |
| 5,829,847 | 11/1998 | Tozu et al. | 701/74 |
| 5,857,754 | 1/1999 | Fukami et al. | 701/72 |
| 5,863,105 | 1/1999 | Sano | 303/146 |
| 5,869,943 | 2/1999 | Nakashima et al. | 701/70 |
| 5,913,578 | 6/1999 | Tozu et al. | 303/140 |
| 5,927,830 | 7/1999 | Tozu et al. | 303/155 |
| 5,931,546 | 8/1999 | Nakashima et al. | 701/72 |

FOREIGN PATENT DOCUMENTS 7-117654   9/1995   Japan .

*Primary Examiner*—Jacques H. Louis-Jacques
*Attorney, Agent, or Firm*—Burns, Doane, Swecker & Mathis, LLP

[57] ABSTRACT

The present invention is directed to a vehicle motion control system for maintaining vehicle stability by controlling a braking force applied to each wheel of the vehicle. In the system, a control map setting unit is adapted to set plural control maps with an x-axis of a slip rate deviation between a desired slip rate and an actual slip rate, and a y-axis of a vehicle acceleration deviation between a vehicle acceleration and a wheel acceleration for each wheel, respectively. Each control map has an origin determined by the desired slip rate and the vehicle acceleration provided for each control mode. A pressure mode setting unit is adapted to set a pressure mode for a pressure control apparatus in each control mode. The pressure mode is set according to a location determined by the slip rate deviation and the vehicle acceleration deviation on the control map. A reference map setting unit is adapted to set a reference map with an x-axis of the slip rate and a y-axis of the vehicle acceleration. A pressure mode selection unit is adapted to select one of the plural pressure modes according to a predetermined priority, when the control maps are superimposed on the reference map to set the control modes for each wheel. The pressure control apparatus is adapted to control the hydraulic pressure in the wheel cylinder in accordance with the selected pressure mode.

7 Claims, 13 Drawing Sheets

F I G. 4
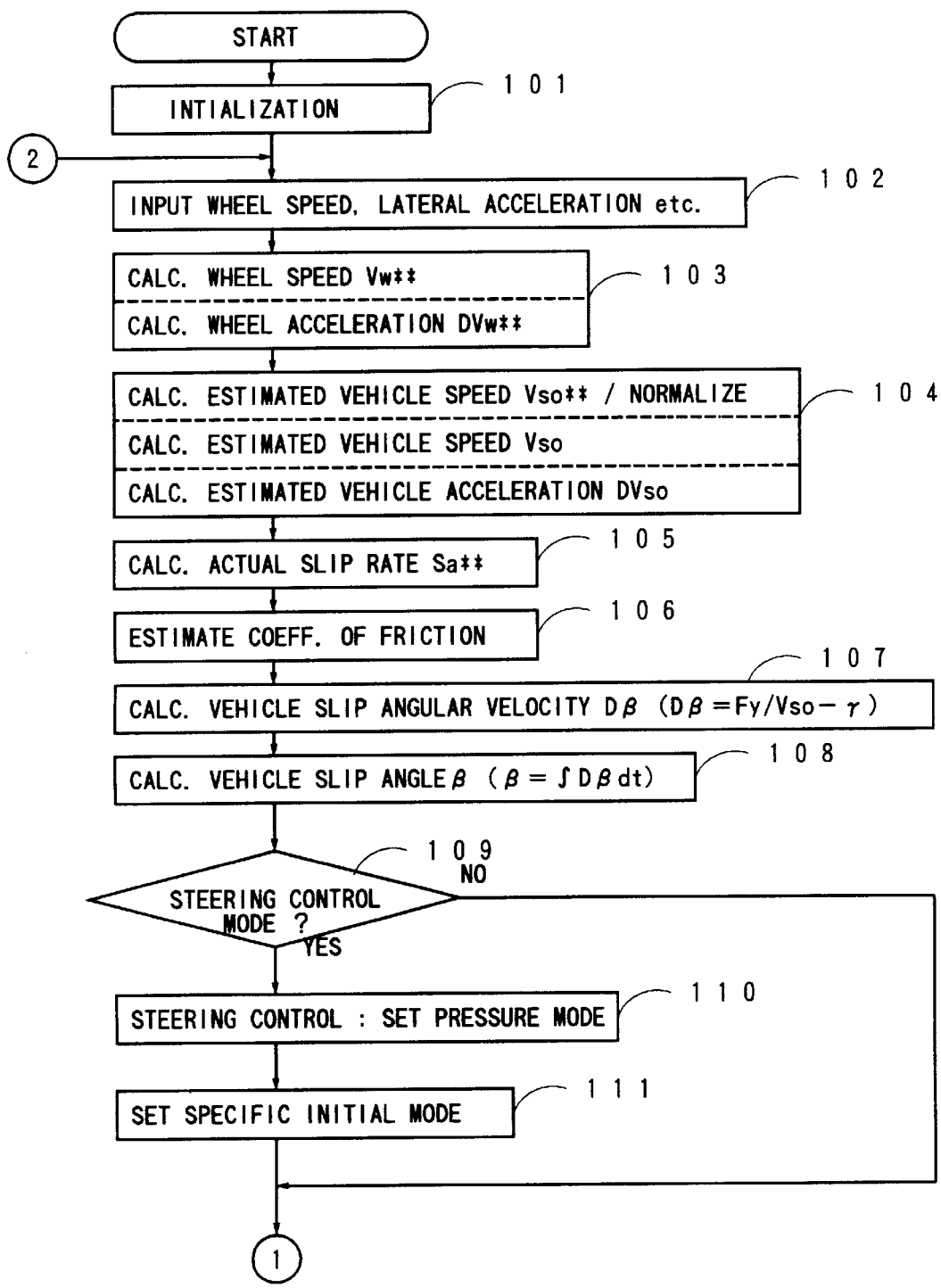

F I G. 1 5
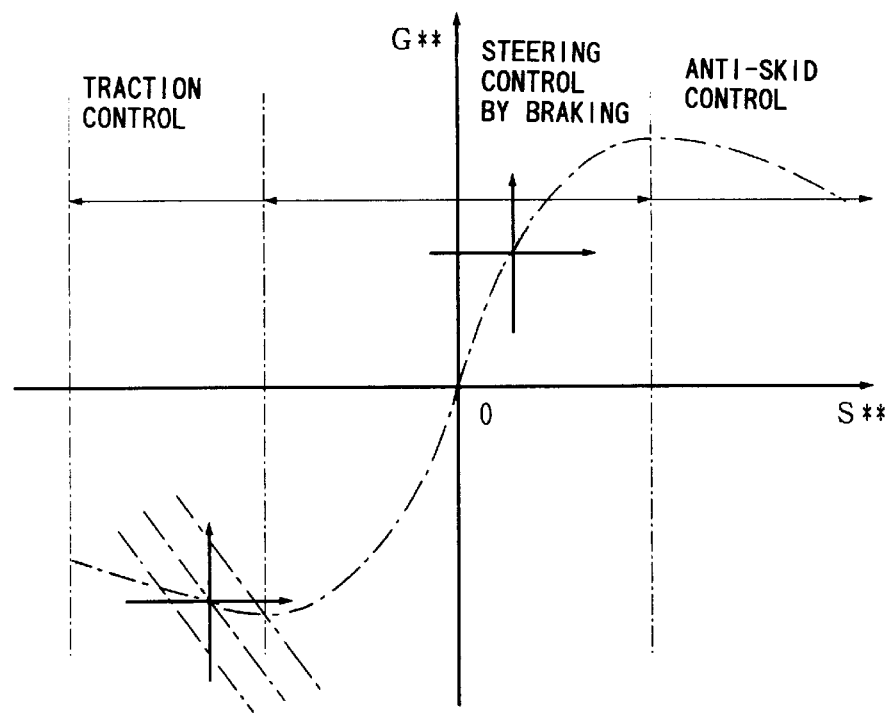
F I G. 1 6
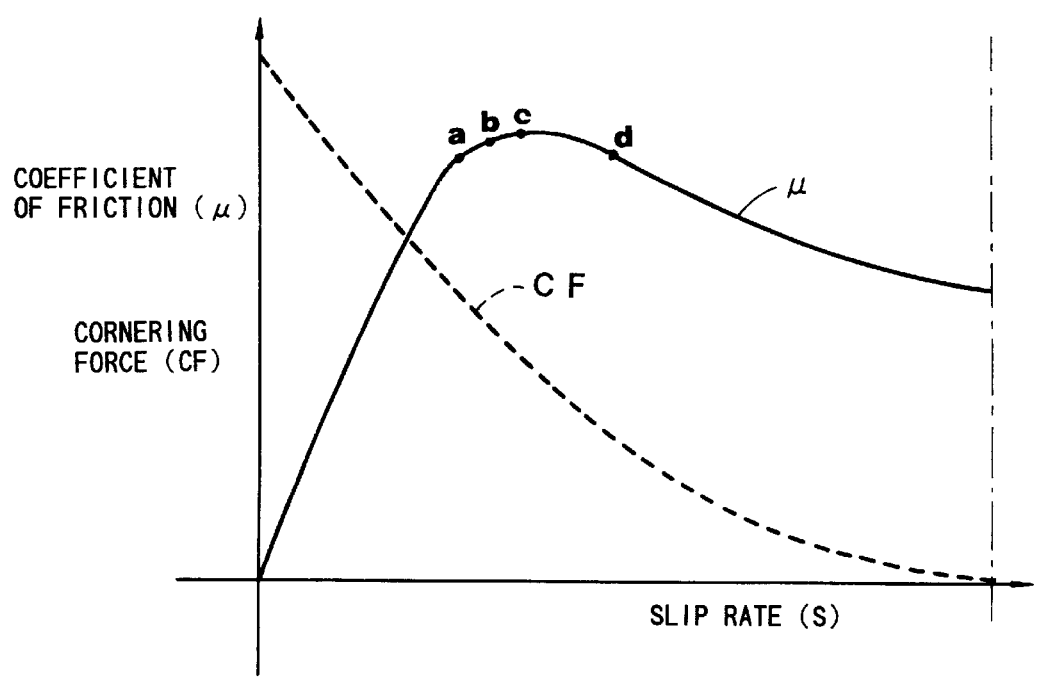

VEHICLE MOTION CONTROL SYSTEM

BACKGROUND OF THE INVENTION

1. Field of the Invention

The present invention relates to a vehicle motion control system for controlling vehicle motion, and more particularly to the control system which performs a steering control by braking to restrain an excessive oversteer and excessive understeer which will occur during, for example, cornering, by applying a braking force to each wheel of the vehicle irrespective of depression of a brake pedal, and which performs an anti-skid control to prevent a wheel from being locked during braking, by controlling the braking force applied to the wheel.

2. Description of the Related Arts

Recently, a vehicle is provided with a braking force control system for controlling the braking force applied to the vehicle to perform an anti-skid control, a traction control, a front-rear braking force distribution control, and etc. In the U.S. Pat. No 4,898,431, for example, an apparatus for controlling vehicle motion through the use of a brake controlling system which compensates for the influence of lateral forces on the vehicle. The apparatus is constituted so as to control the braking force applied to the vehicle by the braking force control system in response to a comparison of a desired yaw rate with an actual yaw rate, thereby to improve the vehicle stability during the course of vehicle motion such as cornering. Consequently, a braking force is applied to each wheel irrespective of depression of a brake pedal, so that a so-called steering control by braking is performed to provide an oversteer restraining control and understeer restraining control.

With respect to a braking force control apparatus for applying a braking force to each wheel of a vehicle in response to a braking condition of the vehicle to correct the vehicle motion, it is proposed in a Japanese Patent Laid-open publication No. 7-117654 to correct an abnormal vehicle motion rapidly and properly by introducing a feed-forward control in addition to a feedback control. In the apparatus, a feedforward control signal is output in response to a desired slip rate, and coupled with a feedback control signal which is output separately from the feedforward control signal, to produce an output signal to a hydraulic pressure control apparatus.

In the recent vehicle, also provided are an anti-skid control mode wherein a hydraulic braking pressure supplied to a wheel brake cylinder is controlled in response to a rotational speed of a wheel so as to control the braking force applied to the wheel, and the like modes, so that the anti-skid control mode and the like are combined with the mode of steering control by braking to provide the effective vehicle motion control system as a whole.

However, if the condition of the vehicle meets the requirements for starting the various control modes as described above, simultaneously, interference among the control modes will occur. For example, if the mode of steering control by braking and the anti-skid control mode are set for a single wheel simultaneously, the interference between those modes will occur. This interference occurs because the mode of steering control by braking is a control mode for applying the braking force to a wheel to be controlled, while the anti-skid control mode is a control mode for reducing the braking force applied to a wheel which tends to be locked. In this case, the anti-skid control mode generally takes priority over the other control mode to provide a so-called safeguard. In the case where the vehicle motion is in a zone for controlling the mode of steering control by braking and the anti-skid control mode simultaneously, however, even if the control mode to be performed is not the anti-skid control mode but the mode of steering control by braking, the anti-skid control is initiated, so that the mode of steering control by barking will be delayed.

Therefore, when plural control modes are set for the wheel to be controlled, it is necessary to provide an appropriate pressure mode until the control mode to be performed is completed, without giving priority to the anti-skid control mode automatically, unless the anti-skid control operation will be performed improperly. Or, when plural maps are provided to set the plural control modes, and when a hydraulic pressure mode is set for each control mode, a large capacity of memory in a computer will be required to execute those modes. Therefore, it is desired to execute the modes as easily as possible.

SUMMARY OF THE INVENTION

Accordingly, it is an object of the present invention to provide a vehicle motion control system wherein an appropriate pressure mode is immediately set according to a desired control mode to execute the desired control smoothly, even if plural control modes are set for the wheel to be controlled, simultaneously.

In accomplishing the above and other objects, a vehicle motion control system is provided for maintaining stability of an automotive vehicle when the vehicle is in motion, by controlling a braking force applied to each wheel of the vehicle. In the system, wheel speed detection means is provided for detecting a wheel speed of each wheel. Wheel acceleration calculating means is provided for calculating a wheel acceleration of each wheel on the basis of the wheel speed detected by the wheel speed detection means, and slip rate calculating means is provided for calculating an actual slip rate of each wheel on the basis of the wheel speed detected by the wheel speed detection means. A vehicle condition monitor is provided for monitoring a condition of the vehicle in motion. A hydraulic braking pressure control apparatus is provided for controlling a hydraulic braking pressure in a wheel cylinder operatively mounted on each wheel for applying braking force thereto, in accordance with a pressure mode selected from plural pressure modes including a pressure increase mode and a pressure decrease mode. Desired slip rate setting means is provided for setting a desired slip rate for each wheel in accordance with a control mode which is selected from plural control modes on the basis of the vehicle condition monitored by the vehicle condition monitor. Slip rate deviation calculating means is provided for calculating a deviation between the desired slip rate and the actual slip rate to obtain a slip rate deviation. Vehicle acceleration detection means is provided for detecting a vehicle acceleration of the vehicle. Vehicle acceleration deviation calculating means is provided for calculating a deviation between the vehicle acceleration and the wheel acceleration for each wheel to obtain a vehicle acceleration deviation. Control map setting means is provided for setting plural control maps with an x-axis of the slip rate deviation and a y-axis of the vehicle acceleration deviation, respectively. Each control map has an origin determined by the desired slip rate and the vehicle acceleration provided for each control mode. Pressure mode setting means is provided for setting a pressure mode for the pressure control apparatus in each control mode. The pressure mode is set according to a location determined by the slip rate deviation and the vehicle acceleration deviation on the control map. Reference map setting means is provided for setting a reference map with an x-axis of the slip rate and a y-axis of the vehicle acceleration. Pressure mode selection means is provided for selecting one of the plural pressure modes according to a predetermined priority, when the control maps are superimposed on the reference map to set the control modes for each wheel. The pressure control apparatus is adapted to control the hydraulic pressure in the wheel cylinder in accordance with the selected pressure mode.

The vehicle acceleration detection means may include vehicle acceleration calculating means for calculating an estimated vehicle acceleration on the basis of the wheel acceleration calculated by the wheel acceleration calculation means, so that the vehicle acceleration deviation calculating means is adapted to calculate a deviation between the estimated vehicle acceleration and the wheel acceleration for each wheel to obtain the vehicle acceleration deviation, and the control map setting means is adapted to set the control maps, each of which has the origin determined by the desired slip rate and the estimated vehicle acceleration provided for each control mode.

BRIEF DESCRIPTION OF THE DRAWINGS

The above stated object and following description will become readily apparent with reference to the accompanying drawings, wherein like reference numerals denote like elements, and in which:

FIG. 4 is a flowchart showing a main routine of the vehicle motion control according to the above embodiment of the present invention;

FIG. 15 is a diagram showing a reference map and a control map including a traction control according to the above embodiment;

FIG. 16 is a diagram showing the relationship between a coefficient of friction and a slip rate according to the above embodiment.

DESCRIPTION OF THE PREFERRED EMBODIMENTS

Figure 1:
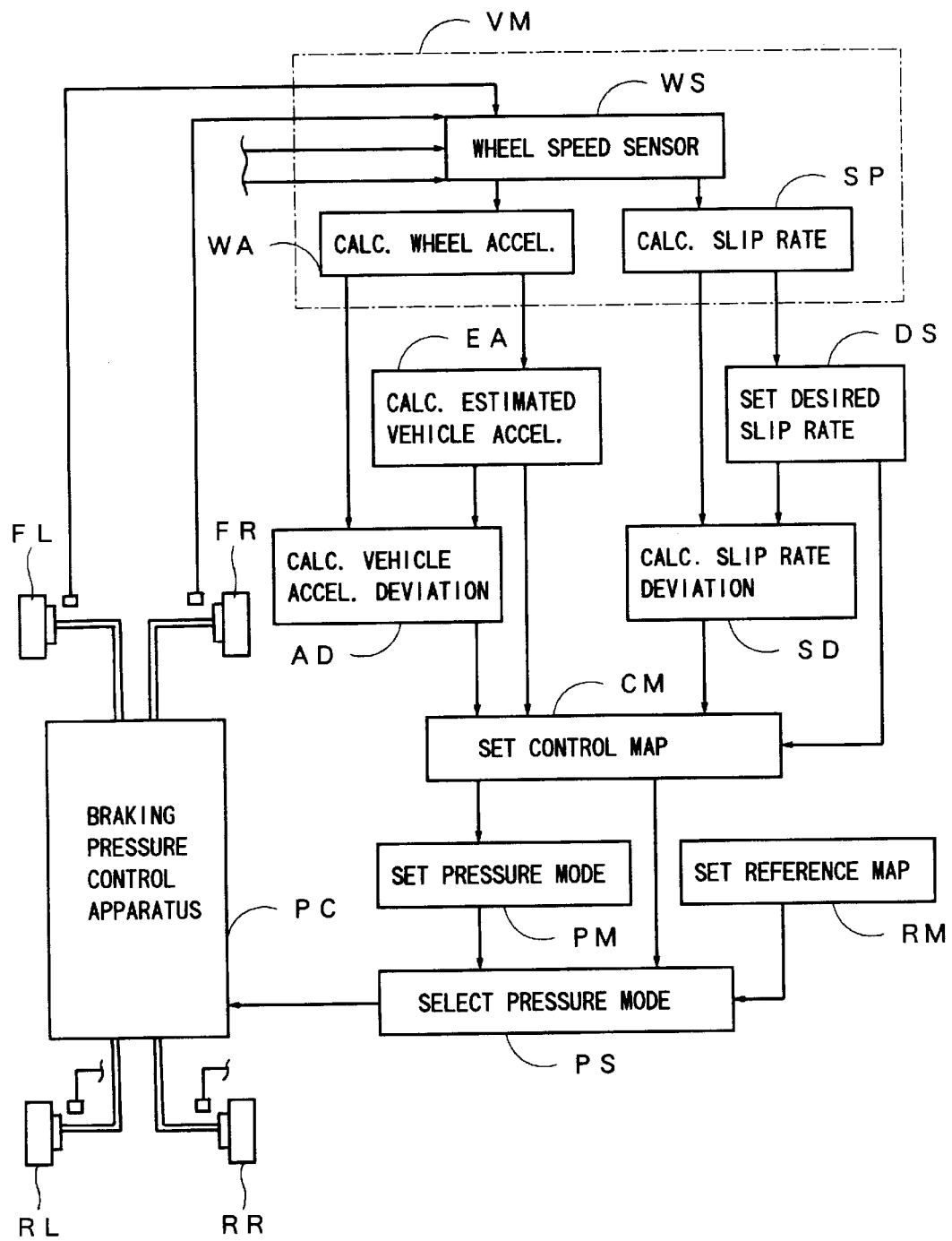
FIG. 1 is a general block diagram illustrating a vehicle motion control system according to an embodiment of the present invention.

Referring to FIG. 1, there is schematically illustrated a vehicle motion control system according to an embodiment of the present invention, wherein a hydraulic braking pressure control apparatus PC is provided for controlling a hydraulic braking pressure in a wheel cylinder which is operatively mounted on each of front wheels FL, FR and rear wheels RL, RR of a vehicle, in accordance with a pressure mode selected from plural pressure modes including a pressure increase mode and a pressure decrease mode. The system includes wheel speed sensors WS, each of which detects a wheel speed of each wheel. A wheel acceleration calculating unit WA is provided for calculating a wheel acceleration of each wheel on the basis of the wheel speed detected by each wheel speed sensor WS, and a slip rate calculating unit SP is provided for calculating an actual slip rate of each wheel on the basis of the wheel speed detected by each wheel speed sensor WS. A vehicle condition monitor VM is provided for monitoring a condition of the vehicle in motion.

A desired slip rate setting unit DS is provided for setting a desired slip rate for each wheel in accordance with a control mode which is selected from plural control modes on the basis of the vehicle condition monitored by the vehicle condition monitor VM. A slip rate deviation calculating unit SD is provided for calculating a deviation between the desired slip rate and the actual slip rate to obtain a slip rate deviation. A vehicle acceleration calculating unit EA is provided for calculating an estimated vehicle acceleration on the basis of the wheel acceleration calculated by the wheel acceleration calculating unit WA. A vehicle acceleration deviation calculating unit AD is provided for calculating a deviation between the estimated vehicle acceleration and the wheel acceleration for each wheel to obtain a vehicle acceleration deviation. A control map setting unit CM is provided for setting plural control maps with an x-axis of the slip rate deviation and a y-axis of the vehicle acceleration deviation, respectively. Each control map has an origin determined by the desired slip rate and the estimated vehicle acceleration provided for each control mode. A pressure mode setting unit PM is provided for setting a pressure mode for the pressure control apparatus PC in each control mode. The pressure mode is set according to a location determined by the slip rate deviation and the vehicle acceleration deviation on the control map. A reference map setting unit RM is provided for setting a reference map with an x-axis of the slip rate and a y-axis of the vehicle acceleration. A pressure mode selection unit PS is provided for selecting one of the plural pressure modes according to a predetermined priority, when the control maps are superimposed on the reference map to set the control modes for each wheel. The pressure control apparatus PC is adapted to control the hydraulic pressure in the wheel cylinder in accordance with the selected pressure mode.

The control map setting unit CM is adapted to set the control maps, each of which has a reference line including each origin, and has plural lines in parallel with the reference line to divide the plane of the control map into plural zones for providing plural pressure modes. The control map setting unit CM my be adapted to set the plural control maps, each of which has the origin shifted to provide a neutral zone, and each of which has a control index provided perpendicularly to the reference line. Then, the pressure mode selection unit PS may be adapted to select each of the pressure modes according to the zone where the tip of the control index locates.

The vehicle condition monitor VM may include the wheel speed sensor WS, the wheel acceleration calculating unit WA and the slip rate calculating unit SP, to detect the wheel speed of each wheel, wheel acceleration, vehicle lateral acceleration, yaw rate and etc., and then calculate an estimated vehicle speed, a vehicle slip angle and etc. on the basis of the detected signals, so that the condition of the vehicle in motion is monitored to determine if an excessive oversteer and/or an excessive understeer occur, and the locking condition of each wheel. The pressure control apparatus PC may include a master cylinder which generates the hydraulic braking pressure in response to depression of the brake pedal BP, and which will be described later, and an auxiliary pressure source having a hydraulic pump and an accumulator, which generates the hydraulic braking pressure irrespective of depression of the brake pedal BP, even in the absence of the brake pedal input, and which will be described later.

Figure 2:
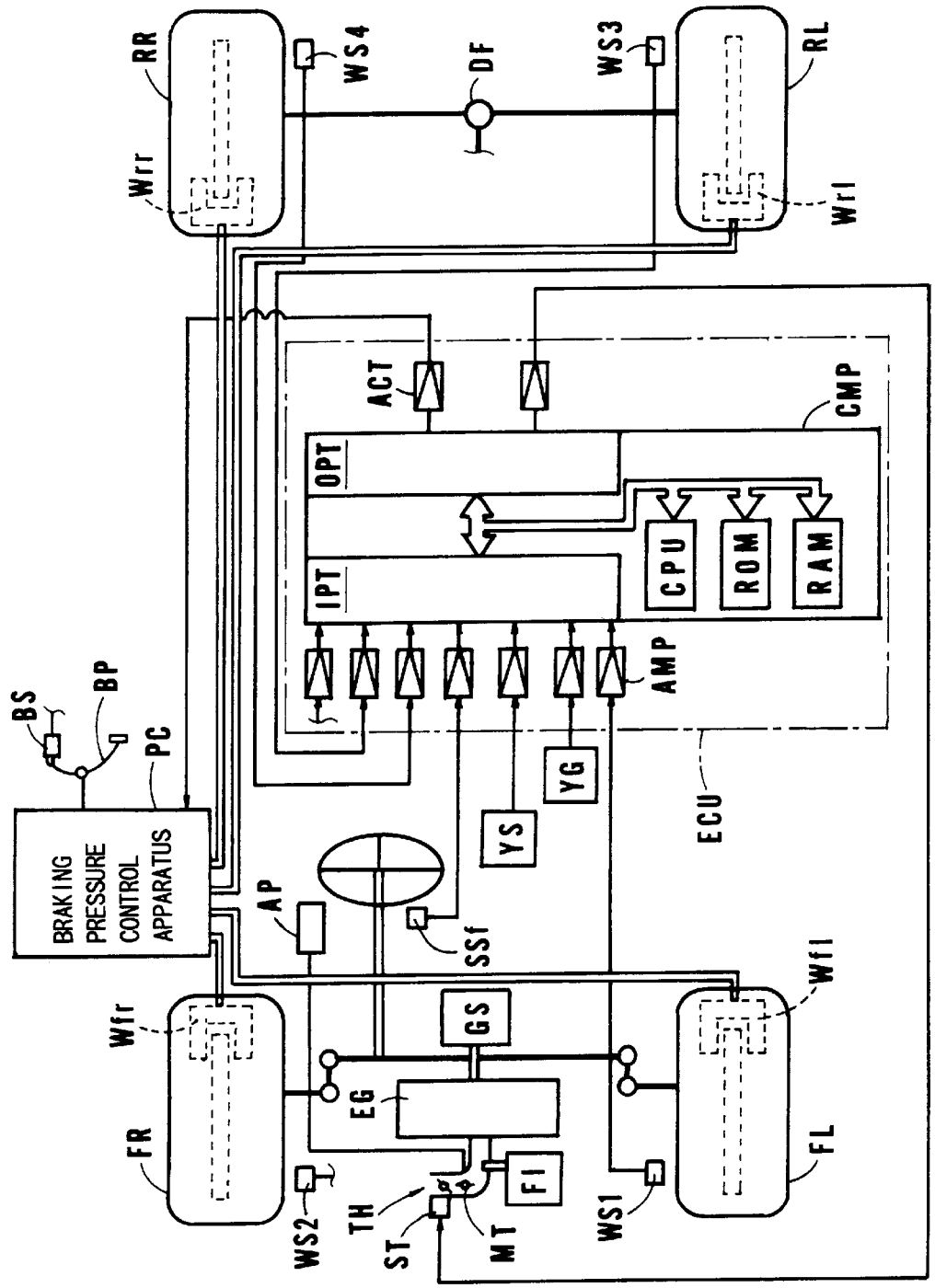
FIG. 2 is a schematic block diagram of a vehicle including the vehicle motion control system of the above embodiment.

More specifically, the details of the embodiment disclosed in FIG. 1 are illustrated in FIGS. 2 to 17. As shown in FIG. 2 the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST, which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus PC. The pressure control apparatus PC in the present embodiment may be arranged as illustrated in FIG. 3 which will be explained later in detail.

As shown in FIG. 2 at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed and turns off when the brake pedal BP is released, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels FL, FR in the present embodiment), i.e., vfd=Vwfl−Vwfr, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

The electronic controller ECU is provided with a microcomputer CMP which includes a central processing unit or CPU, a read-only memory or ROM, a random access memory or RAM an input port IPT, and an output port OPT, and etc., as shown in FIG. 2. The signals detected by each of the wheel speed sensors WS1 to WS4 brake switch BS front steering angle sensor SSf, yaw rate sensor YS and lateral acceleration sensor YG are fed to the input port IPT via respective amplification circuits AMP and then to the central processing unit CPU. The control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 4 to 7, the central processing unit CPU executes the program while the ignition switch (not shown) is closed, and the random access memory RAM temporarily memorizes variable data needed to execute the program. Plural microcomputers may be provided for each control such as throttle control, or may be provided for performing various controls, and electrically connected to each other.

Figure 3:
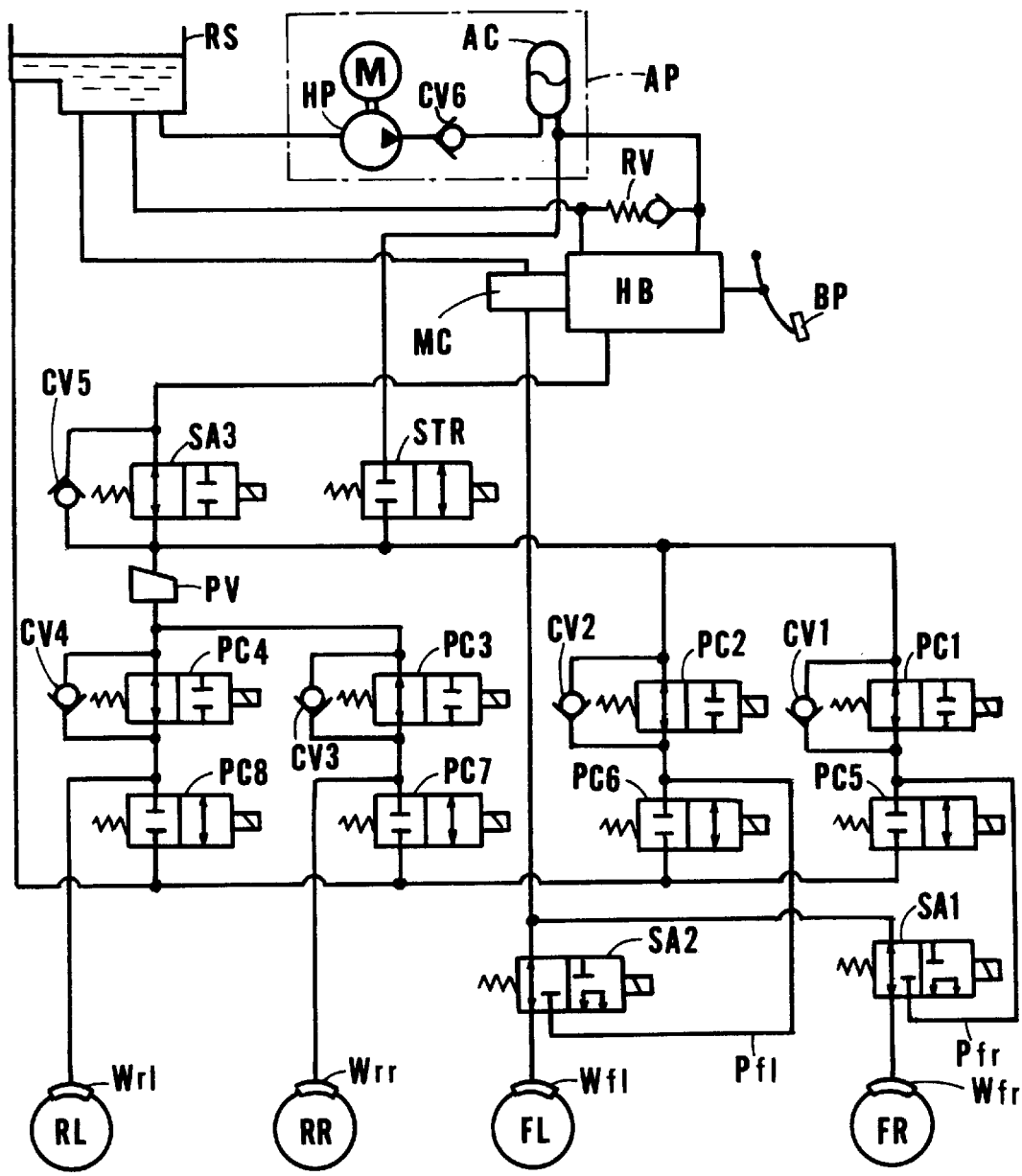
FIG. 3 is a block diagram illustrating an embodiment of a hydraulic braking pressure control apparatus for use in the above embodiment.

FIG. 3 shows an embodiment of the hydraulic braking pressure control apparatus PC which includes a master cylinder MC and a hydraulic booster HB which are activated in response to depression of the brake pedal BP. The hydraulic booster HB is connected to an auxiliary pressure source AP, both of which are connected to a low-pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve Cv6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wrl and etc., a solenoid valve SA3, solenoid valves PCI-PC8 for use in the control of discharging and draining of the brake fluid are disposed, and a proportioning pressure decreasing valve PV is disposed at the rear wheels' side. Then the auxiliary pressure source AP is connected to the downstream side of the solenoid valve SA3 through a solenoid valve STR. The hydraulic circuits are divided into the front circuit system and the rear circuit system as shown in FIG. 3 to form a front and rear dual circuit system according to the present embodiment, while a diagonal circuit system may be employed.

With respect to the front hydraulic pressure circuit the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions respectively where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 3, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl, respectively. The check valves CV3 and CV4 are provided for allowing the flow of the brake fluid toward the solenoid valve SA3 and preventing the reverse flow. Therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3 so that the brake fluid may be supplied from the hydraulic booster HB to the wheel brake cylinders in response to depression of the brake pedal BP even when the solenoid valve SA3 is placed in its closed position.

The above-described solenoid valves SA1, SA2, SA3, STR, and solenoid valves PC1–PC8 are controlled by the electronic controller ECU to provide various control modes for controlling the stability of the vehicle, such as the steering control by braking, anti-skid control, and other various control modes. For example, when it is determined that the excessive oversteer occurs during cornering, a braking force will be applied to a front wheel located on the outside of the curve in the vehicle's path for example, to produce a moment for forcing the vehicle to turn in the direction toward the outside of the curve, i.e., an outwardly oriented moment, in accordance with an oversteer restraining control which may be called as a vehicle stability control. When it is determined that the excessive understeer occurs while a vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above described oversteer restraining control and understeer restraining control as a whole may be called as the steering control by braking.

Accordingly, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized, the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the oversteer restraining control and/or the understeer restraining control can be performed as noted previously.

Figure 5:
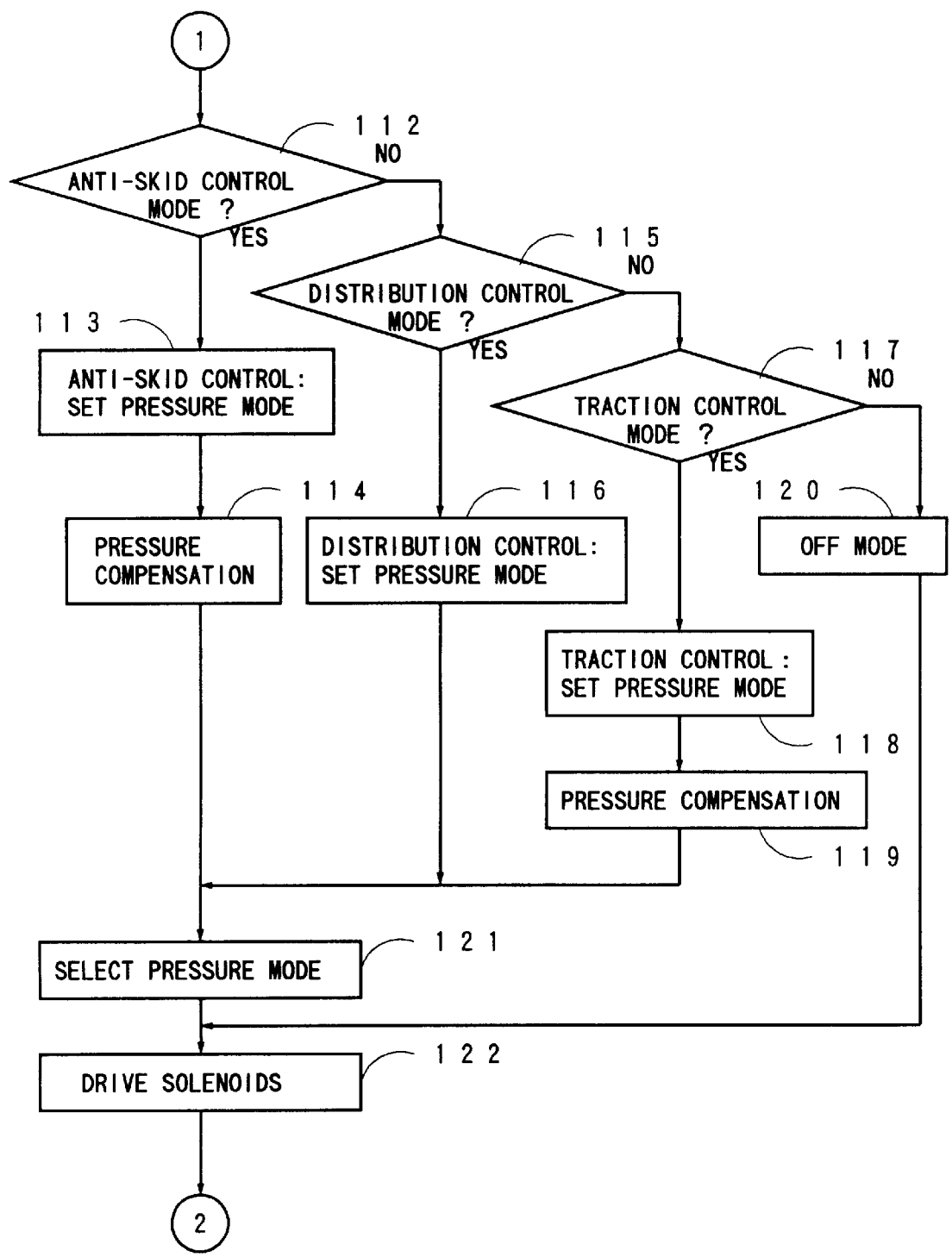
FIG. 5 is a flowchart showing the main routine of the vehicle motion control according to the above embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 7. The program routine starts when an ignition switch (not shown) is turned on. At the outset, the program for the vehicle motion control as shown in FIGS. 4 and 5 provides for initialization of the system at Step 101 to clear various data. At Step 102, the signals detected by the wheel speed sensors WS1 to WS4 are read by the electronic controller ECU, and also read are the signal (steering angle δf)

detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. The maximum value of the wheel speeds Vw for four wheels is calculated to provide an estimated vehicle speed Vso on a gravity center of the vehicle (Vso=MAX[Vw]), an estimated vehicle speed Vso is calculated for each wheel, respectively, on the basis of the wheel speed Vw at step 104. The estimated vehicle speed VSo may be normalized to reduce the error caused by a difference between the wheels located on the inside and outside of the curve while cornering. Furthermore, the estimated vehicle speed Vso is differentiated to provide an estimated vehicle acceleration DVso. At Step 105, also calculated is an actual slip rate Sa on the basis of the wheel speed Vw for each wheel and the estimated vehicle speed Vso (or, the estimated and normalized vehicle speed NVso) which are calculated at Steps 103 and 104**, respectively, in accordance with the following equation:

$$Sa^{} = (Vso - Vw^{})/Vso$$

Next, at Step 106, on the basis of the vehicle acceleration DVso and the actual lateral acceleration Gya detected by the lateral acceleration sensor YG, the coefficient of friction $\mu$ against a road surface can be calculated in accordance with the following equation:

$$\mu \approx (Dvso^2 + Gya^2)^{1/2}$$

In order to detect the coefficient of friction against the road surface, various methods may be employed other than the above method such as a sensor for directly detecting the coefficient of friction against the road surface, for example.

The program proceeds to step 107, where a vehicle slip angular velocity Dβ is calculated, and a vehicle slip angle β is calculated at Step 108. This vehicle slip angle β is an angle which corresponds to a vehicle slip against the vehicle's path of travel, and which can be estimated as follows. That is, at the outset, the vehicle slip angular velocity Dβ, which is a differentiated value of the vehicle slip angle β, is calculated at Step 107 in accordance with the following equation:

$$D\beta = Gy/Vso - \gamma$$

Then, the vehicle slip angle β is calculated at Step 108 in accordance with the following equation:

$$\beta = \int (Gy/Vso - \gamma) dt$$

where "Gy" is the lateral acceleration of the vehicle, "Vso" is the estimated vehicle speed of the vehicle measured at its gravity center, and "γ" is the yaw rate. The vehicle slip angle β may be calculated in accordance with the following equation:

$$\beta = \tan^{-1}(Vy/Vx)$$

where "Vx" Is a longitudinal vehicle speed, and "Vy" is a lateral vehicle speed.

Then, the program proceeds to step 109 where a condition for initiating the steering control by braking is determined. If it is determined that the steering control by braking is to be initiated, the program proceeds to Step 110 where the pressure mode for that control is set. That is, a desired slip rate for use in the steering control by braking is set as described later, and a pressure servo control is performed so that the brake pressure control apparatus PC is controlled in response to the vehicle condition in motion, thereby to control the braking force to each wheel. The steering control by braking is performed at the same time as other control modes. Then, a specific initial mode is set at Step 111.

The program further proceeds to Step 112, where it is determined whether the condition for initiating the anti-skid control has been fulfilled or not. If it is determined that the condition for initiating the ant-skid control has been fulfilled, the pressure mode for performing the anti-skid control is set at Step 113. Thereafter, in the case where the relationship between the pressure mode set at the present cycle and the pressure mode set at the previous cycle is that of changing from the pressure increase mode to the pressure decrease mode or vice versa, a pressure compensation will be made at Step 114, before the program will proceed further to Step 121.

If it is determined at Step 112 that the condition for initiating the anti-skid control has not been fulfilled, then the program proceeds to step 115 where it is determined whether the condition for initiating the front and rear braking force distribution control is fulfilled or not. If the front and rear braking force distribution control is to be performed, the program proceeds to Step 116 where the pressure mode for performing the braking force distribution control is set, otherwise it proceeds to Step 117, where it is determined whether the condition for initiating the traction control is fulfilled or not. If the condition for initiating the traction control is fulfilled, the program proceeds to step 118 where the pressure mode for performing the traction control is set, and the pressure compensation is made at Step 119, and then the program proceeds to Step 121. At Step 121, the plural pressure modes as set in the above Steps are compared with each other to provide a priority for performing the Steps. In accordance with the priority, an ultimate pressure mode is set, and the program proceeds to Step 122. If it is determined at Step 117 that the condition for initiating the traction control has not been fulfilled, the program proceeds to Step 120 where solenoids for all of the solenoid valves are turned off, and then the program returns to Step 122. At Step 122, each solenoid valve for the brake pressure control apparatus PC is driven in accordance with the pressure mode.

In the anti-skid control mode, the pressure decrease operation is made to prevent the wheel from being locked. With respect to the pressure increase operation to be performed after the pressure decrease operation in the anti-skid control mode, a pressure compensation operation is made to increase the wheel cylinder pressure in accordance with the total amount of the decreased pressure. For example, the amount of pressure to be increased is modified on the basis of the total time of the pressure decrease operation performed by the previous cycle, the wheel acceleration, the coefficient of friction and so on. On the contrary, in order to prevent any excessive decrease of the braking force and excessive increase of the cornering force from being caused when the pressure decrease operation is performed in the ant-skid control mode, pressure decrease compensation is performed to compensate the decreased amount.

Figure 17:
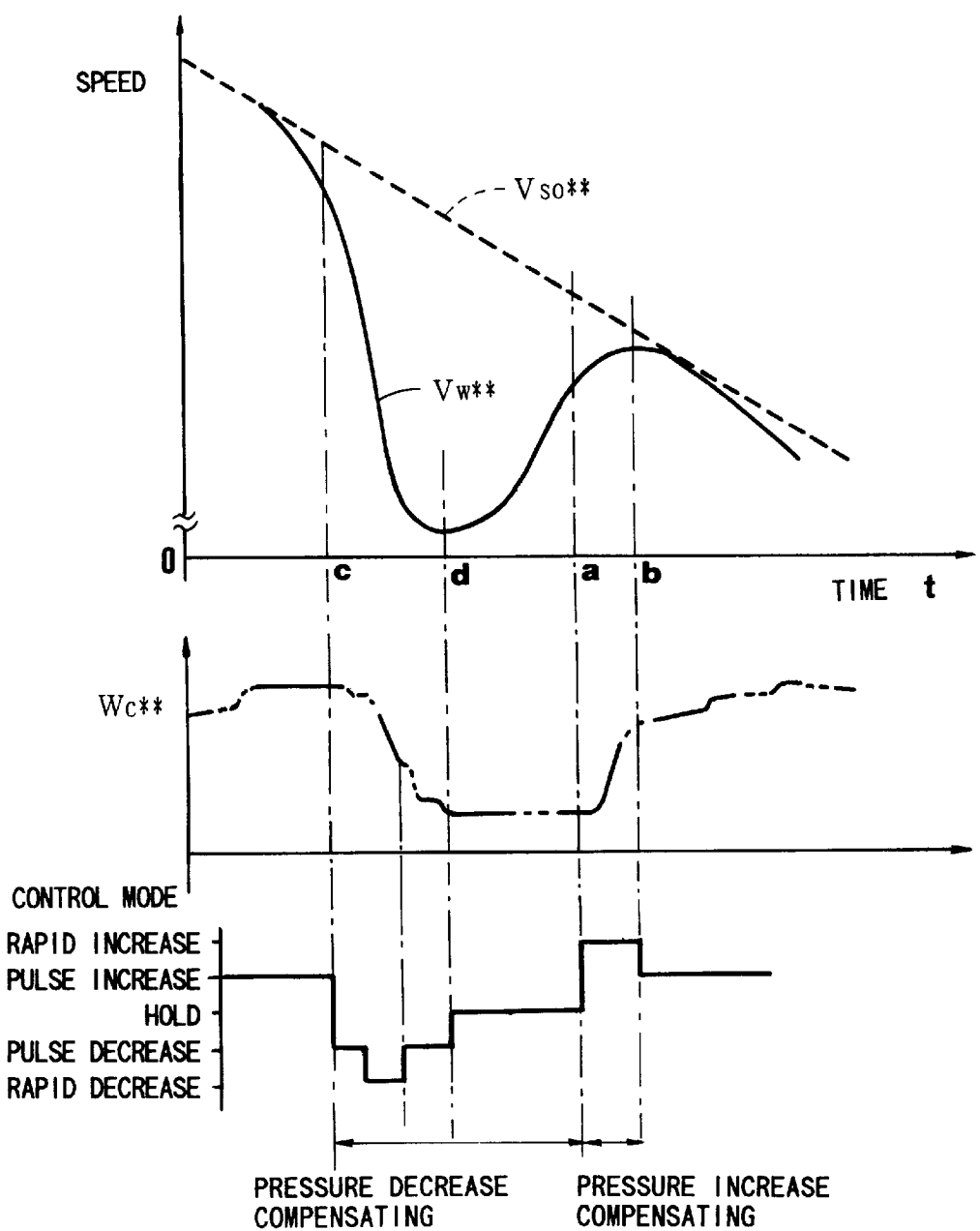
FIG. 17 is a diagram showing a condition of a wheel under an anti-skid control.

FIG. 16 illustrates a $\mu$-S curve which indicates a relationship between a coefficient of friction $\mu$ of a road or cornering force CF and a slip rate S. And, FIG. 17 illustrates a condition under an anti-skid control with respect to a certain wheel, wherein points (a)–(d) correspond to the points (a)–(d) indicated on the μ-S curve in FIG. 16. In FIG. 17, "Vso" indicates the estimated vehicle speed, "Vw" indicates the wheel speed, and "Wc**" indicates the wheel cylinder pressure. In FIGS. 16, 17, point (c) indicates a peak value of the coefficient of friction (μ-Peak) at which the anti-skid control starts, point (d) indicates an end of rapid pressure decrease operation, point (a) indicates a transitional point from a hold (or, pressure decrease operation) to a pressure increase operation, and point (b) indicates an end of a pressure increase compensating control. As shown in FIG. 17, a zone from the point (c) to the point (a) corresponds to the zone for performing the pressure decrease compensating control, while a zone from the point (a) to the point (b) corresponds to the zone for performing the pressure increase compensating control.

In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control may be performed, so as to prevent the driven wheel from slipping during the vehicle driving operation.

Figure 6:
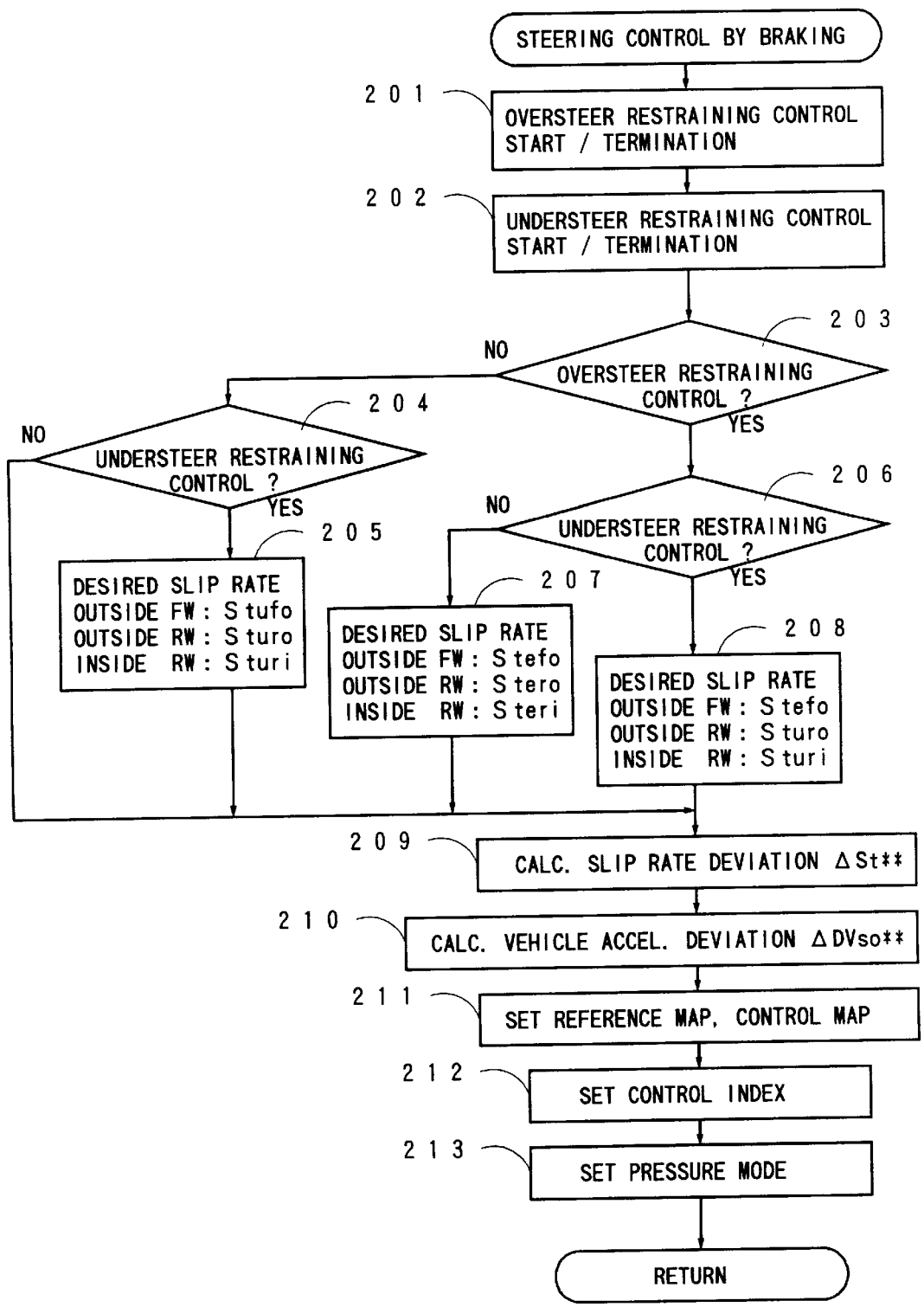
FIG. 6 is a flowchart showing a sub-routine for setting a pressure mode in case of a steering control by braking according to the above embodiment of the present invention.
Figure 8:
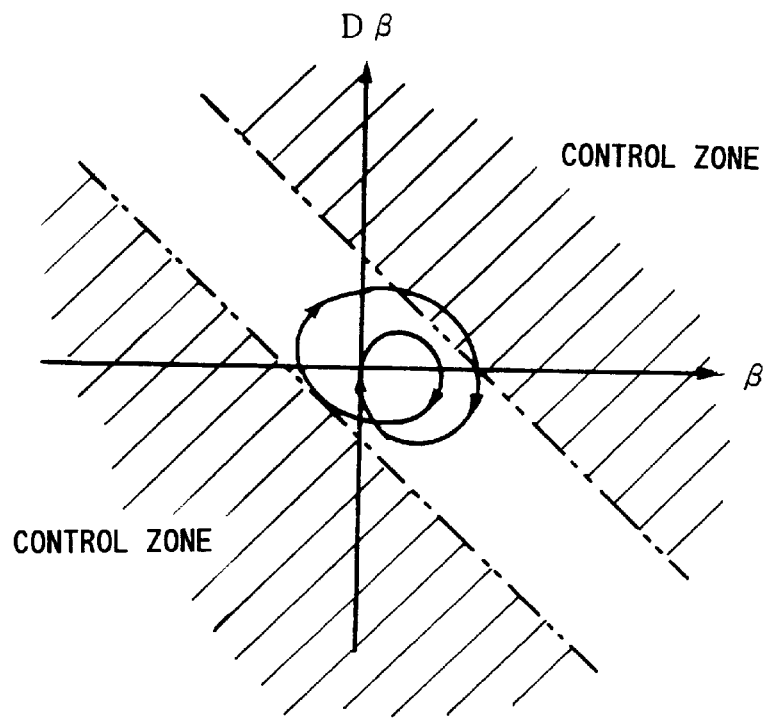
FIG. 8 is a diagram showing zones for determining start and termination of the oversteer restraining control according to above embodiment of the present invention.

FIG. 6 shows a sub-routine for setting pressure modes in the steering control by braking performed at Step 110 as shown in FIG. 4, wherein the steering control by braking includes the oversteer restraining control and the understeer restraining control. Through this flowchart, therefore, the desired slip rates are set in accordance with the oversteer restraining control and/or the understeer restraining control. At the outset, it is determined at Step 201 whether the oversteer restraining control is to be started or terminated, and also determined at Step 202 whether the understeer restraining control is to be started or terminated. More specifically, the determination of the oversteer restraining control is made at Step 201 on the basis of the determination whether it is within a control zone indicated by hatching on a β-Dβ plane as shown in FIG. 8. That is, if the vehicle slip angle β and the vehicle slip angular velocity Dβ which are calculated when determining the start or termination, are fallen within the control zone, the oversteer restraining control will be started. However, if the vehicle slip angle β and the vehicle slip angular velocity Dβ come to be out of the control zone, the oversteer restraining control will be controlled as indicated by the arrow in FIG. 8 thereby to be terminated. Therefore, the boundary between the control zone and non-control zone (as indicted by two dotted chain line in FIG. 8) corresponds to the boundary of a starting zone. And, the braking force applied to each wheel is controlled in such a manner that the farther they remote from the boundary between the control zone and non-control zone (two dotted chain line in FIG. 8) toward the control zone, the more the amount to be controlled will be provided.

Figure 9:
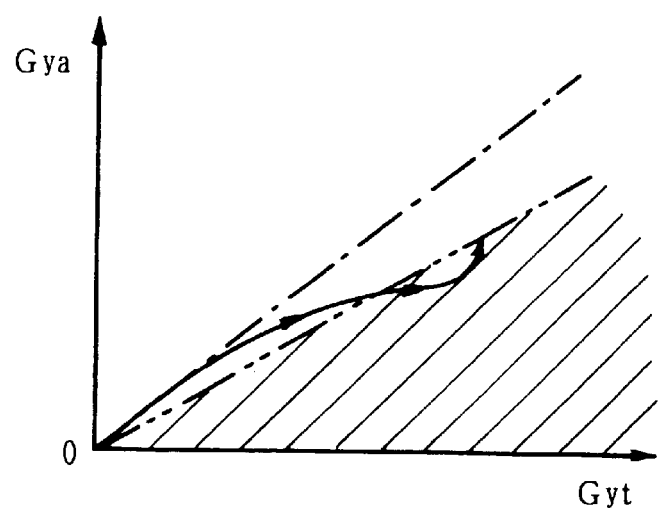
FIG. 9 is a diagram showing zones for determining start and termination of the understeer restraining control according to above embodiment of the present invention.

On the other hand, the determination of the start and termination is made at Step 202 on the basis of the determination whether it is within a control zone indicated by hatching in FIG. 9. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 9 thereby to be terminated.

Then, the program proceeds to Step 203, where it is determined whether the oversteer restraining control is to be performed or not. If the oversteer restraining control is not to be performed, the program further proceeds to Step 204, where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to the desired slip rate which is provided for use in the understeer restraining control. If it is determined at Step 203 that the oversteer restraining control is to be performed, the program proceeds to Step 206, where it is determined whether the understeer restraining control is to be performed or not. In the case where the understeer restraining control is not to be performed, the program proceeds to step 207, where the desired slip rate of each wheel is set to a desired slip rate which is provided for use in the oversteer restraining control. In the case where it is determined at Step 206 that the understeer restraining control is to be performed, the program proceeds to Step 208, where the desired slip rate of each wheel is set to the desired slip rate which is provided for use in both of the oversteer restraining control and the understeer restraining control.

With respect to the desired slip rate for use in the oversteer restraining control set at Step 207, the vehicle slip angle β and the vehicle slip angular velocity Dβ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt = \gamma(\theta f) \cdot Vso;$$

$$\gamma(\theta f) = \{\theta f/(N \cdot L)\} \cdot Vso/(1 + Kh \cdot Vso^2)$$

where "Kh" is a stability factor, "N" is a steering gear ratio and "L" is a wheelbase of the vehicle. At Step 205 the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured actual value indicated by "a". Then, "u" indicates the understeer restraining control, "r" indicates the rear wheel, "o" indicates the outside of the curve, and "i" indicates the inside of the curve, respectively. At Step 207, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control. In FIG. 6, "FW" indicates a front wheel, while "RW" indicates a rear wheel.

Whereas, at Step 208, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$Stefo = K1 \cdot \beta + K2 \cdot D\beta$$

$$Stero = K3 \cdot \beta + K4 \cdot D\beta$$

$$Steri = K5 \cdot \beta + K6 \cdot D\beta$$

where "K1" to "K6" are constants which are set so as to provide the desired slip rates Stefo, Stero, which are used for increasing the braking pressure (i.e., increasing the braking force), and the desired slip rate Steri, which is used for decreasing the braking pressure (i.e., decreasing the braking force).

On the contrary, the desired slip rates Stufo, Sturo and Sturi for use in the understeer restraining control are calculated in accordance with the following equations, respectively:

$$Stufo = K7 \cdot \Delta Gy$$

$$Sturo = K8 \cdot \Delta Gy$$

$$Sturi = K9 \cdot \Delta Gy$$

where "K7" is a constant for providing the desired slip rate Stufo, which is used for increasing the braking pressure (or, alternatively decreasing the braking pressure), while "K8" and "K9" are constants for providing the desired slip rates Sturo, Sturi, both of which are used for increasing the braking pressure.

Then, the program proceeds to step 209, where a difference between the desired slip rate St and the actual slip rate Sa is calculated to provide a slip rate deviation ΔS for each wheel is calculated (ΔS=Sa−St). The program further proceeds to Step 210 where a difference between the estimated vehicle acceleration DVso for each wheel and the wheel acceleration DVw for the wheel to be controlled is calculated to provide an acceleration deviation ΔDVSO (ΔDVSO=DVso−DVw).

Figure 10:
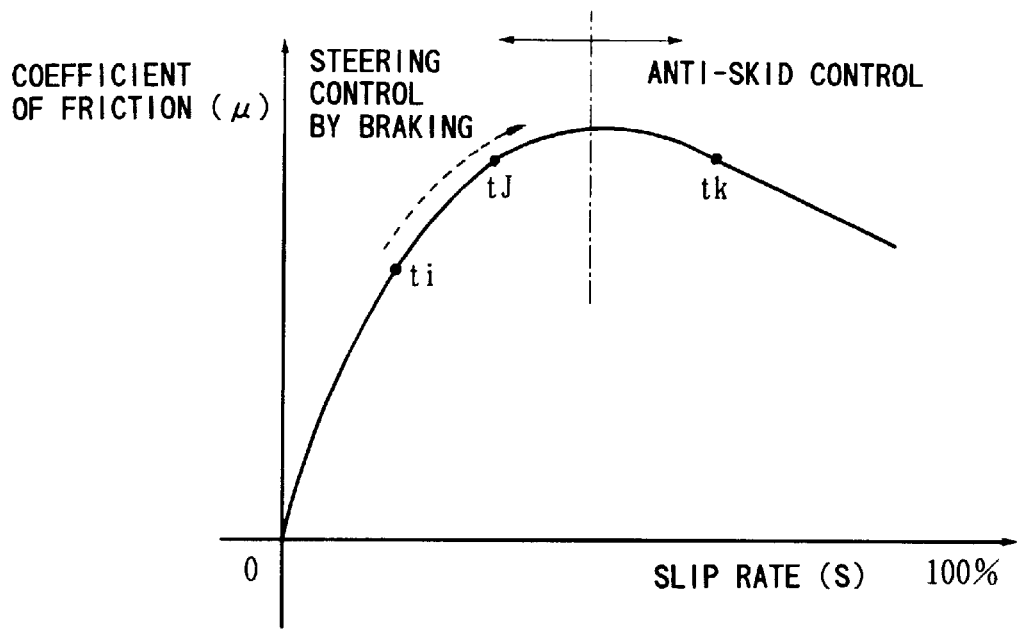
FIG. 10 is a diagram showing the relationship between a coefficient of friction and a slip rate.
Figure 11:
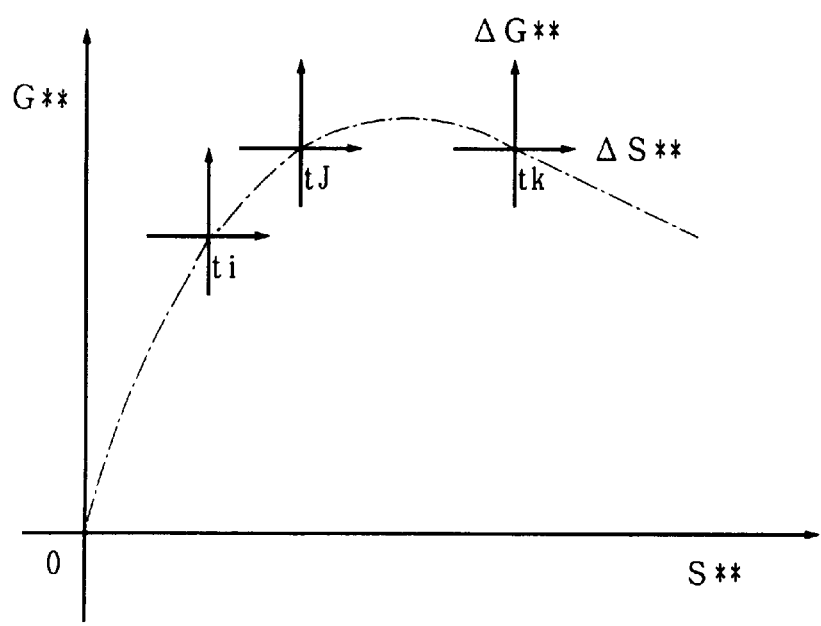
FIG. 11 is a diagram showing a condition where plural control modes were superimposed on a reference map according to the above embodiment.

At Step 211, a control map for the steering control by braking is superimposed on a reference map with an x-axis of the slip rate S and a y-axis of the vehicle acceleration G, as shown in FIG. 11. The reference map is a map corresponding to the μ-S curve as shown in FIG. 10, wherein μ corresponds to G, and S corresponds to S. The reference map is commonly used for each control mode. The control maps as described later are provided at the time ti, tj, tk, respectively. Accordingly, the control map for steering control by braking as shown in FIG. 12, the control map for the anti-skid control as shown in FIG. 13 and so on are superimposed on the reference map as shown in FIG. 11, so that the pressure mode is set in accordance with each control map.

Figure 12:
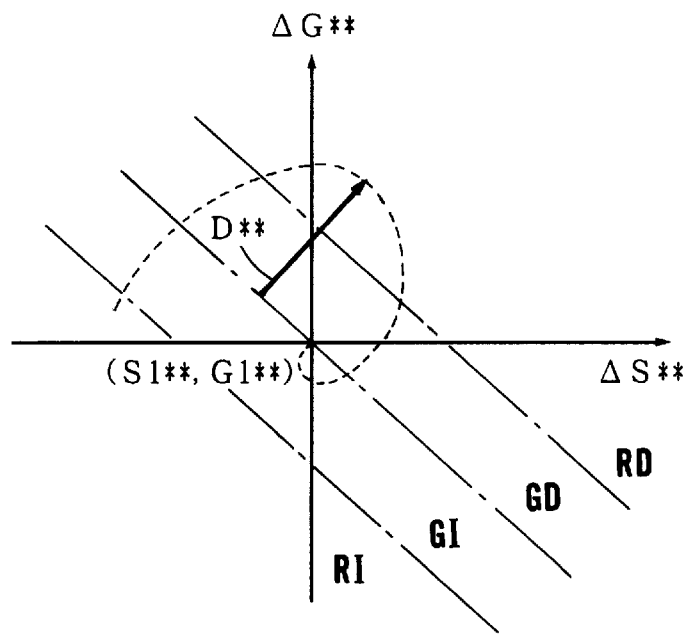
FIG. 12 is a diagram showing a control map for a mode of steering control by braking according to the above embodiment.
Figure 13:
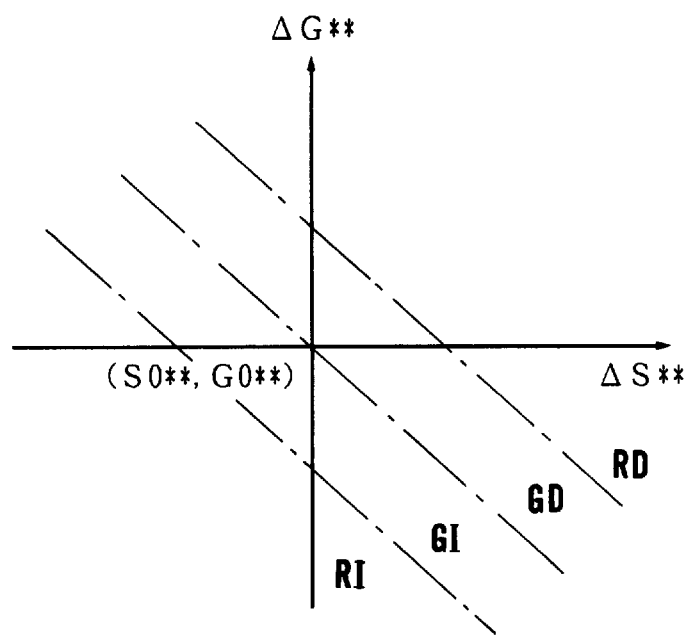
FIG. 13 is a diagram showing a control map for an anti-skid control mode according to the above embodiment.
Figure 14:
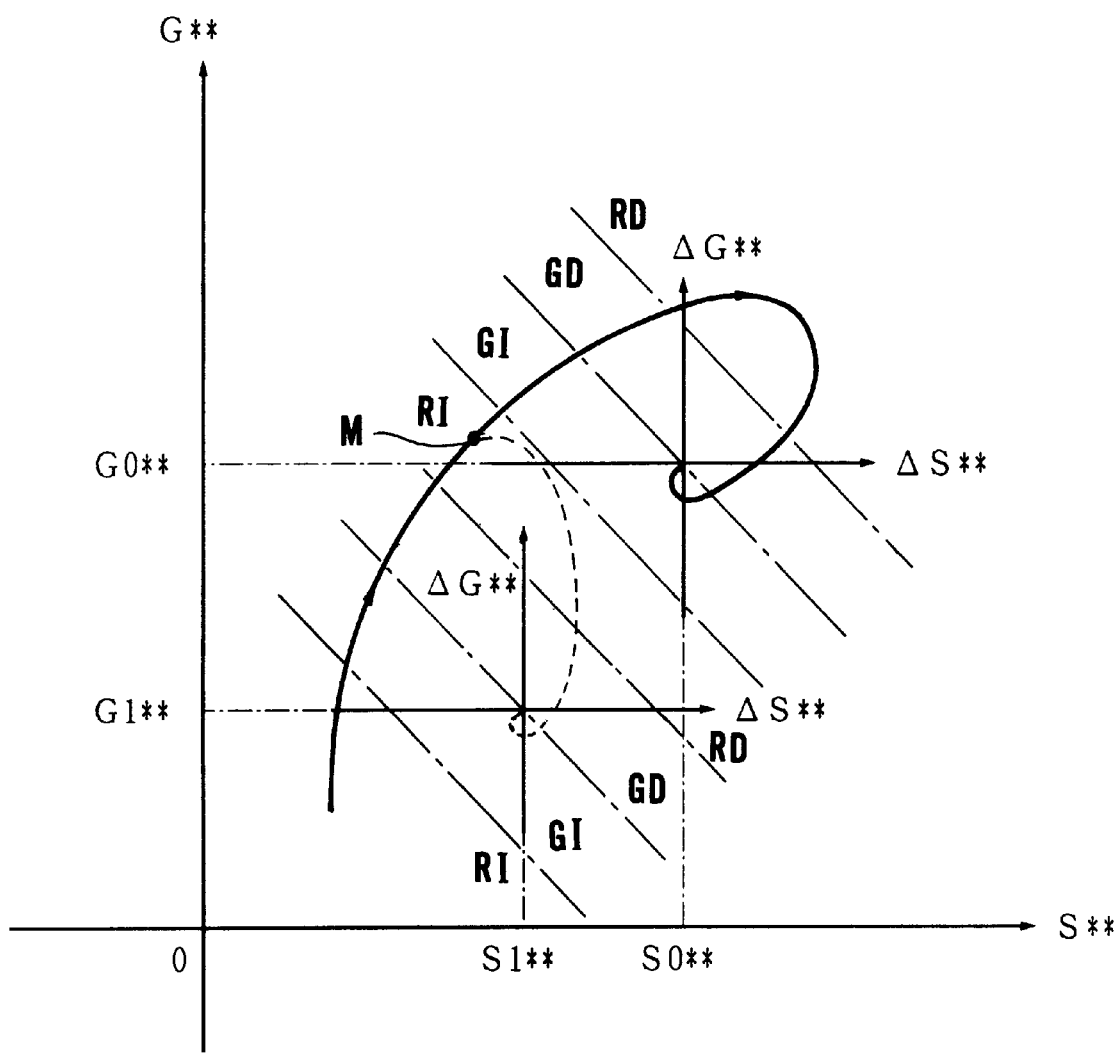
FIG. 14 is a diagram showing an example of a control under a condition where plural control modes are superimposed on a reference map according to the above embodiment.

FIG. 12 illustrates the control map for the steering control by braking, which is set at Step 211. Its origin is located on a position of the desired values (S1, G1) on the control map, its x-axis corresponds to the slip rate deviation ΔS, and its y-axis corresponds to the acceleration deviation ΔDVso (indicated by ΔG in FIG. 12). On the x-y plane, there is formed a reference line including the origin. In parallel with the reference line are formed a pair of lines which divides the plane into four zones of RI, RD, GI, GD. In FIG. 12, the zone GI is provided for a pulse pressure increase mode, and the zone RI for a rapid pressure increase mode. Whereas, the zone GD is provided for a pulse pressure decrease mode, and the zone RI for a rapid pressure decrease mode. The value G1 for defining the origin is a value which is obtained by adding a neutral zone to the estimated vehicle acceleration, while ΔGd is added to the estimated vehicle speed, when no control is being performed. FIG. 13 shows the control map for the anti-skid control, wherein its origin is located on a position of the desired values (S0, G0) on the control map, its x-axis corresponds to the slip rate deviation ΔS, and its y-axis corresponds to the vehicle acceleration deviation ΔG.

At Step 212 in FIG. 6, therefore, a control index D as shown in FIG.12 is provided in accordance with the slip rate ΔS and the vehicle acceleration deviation ΔDVso (=ΔG) which are obtained at Steps 209 and 210, respectively. The length of the control index D is equal to the length of a perpendicular from a random point to a reference line including the origin, i.e., a distance from the reference line. Then, the program proceeds to Step 213, where a pressure mode is set to the one fallen within the zone where the tip of the control index is located. For instance, the rapid pressure decrease mode is set in the zone RD, as shown in FIG. 12. In the case where the tip of the control index D is located in the zone GI or GD, the pulse increase mode or the pulse decrease mode is selected. A period Tb and on-time are set for each control pulse signal. The period Tb is calculated in accordance with the following formula:

$$Tb = Kb - Kc \cdot D^{**}$$

where "Kb" and "Kc" are constants. Accordingly, on the basis of the slip rate ΔS and the vehicle acceleration deviation ΔDVso, the pressure mode is set according to the control map as shown in FIG. 12 (or, FIG. 13 in case of the anti-skid control). Then, the wheel cylinder pressure for the wheel to be controlled is regulated until it will converge on the origin of desired values, or the target, as illustrated by a broken line in FIG. 12.

Figure 7:
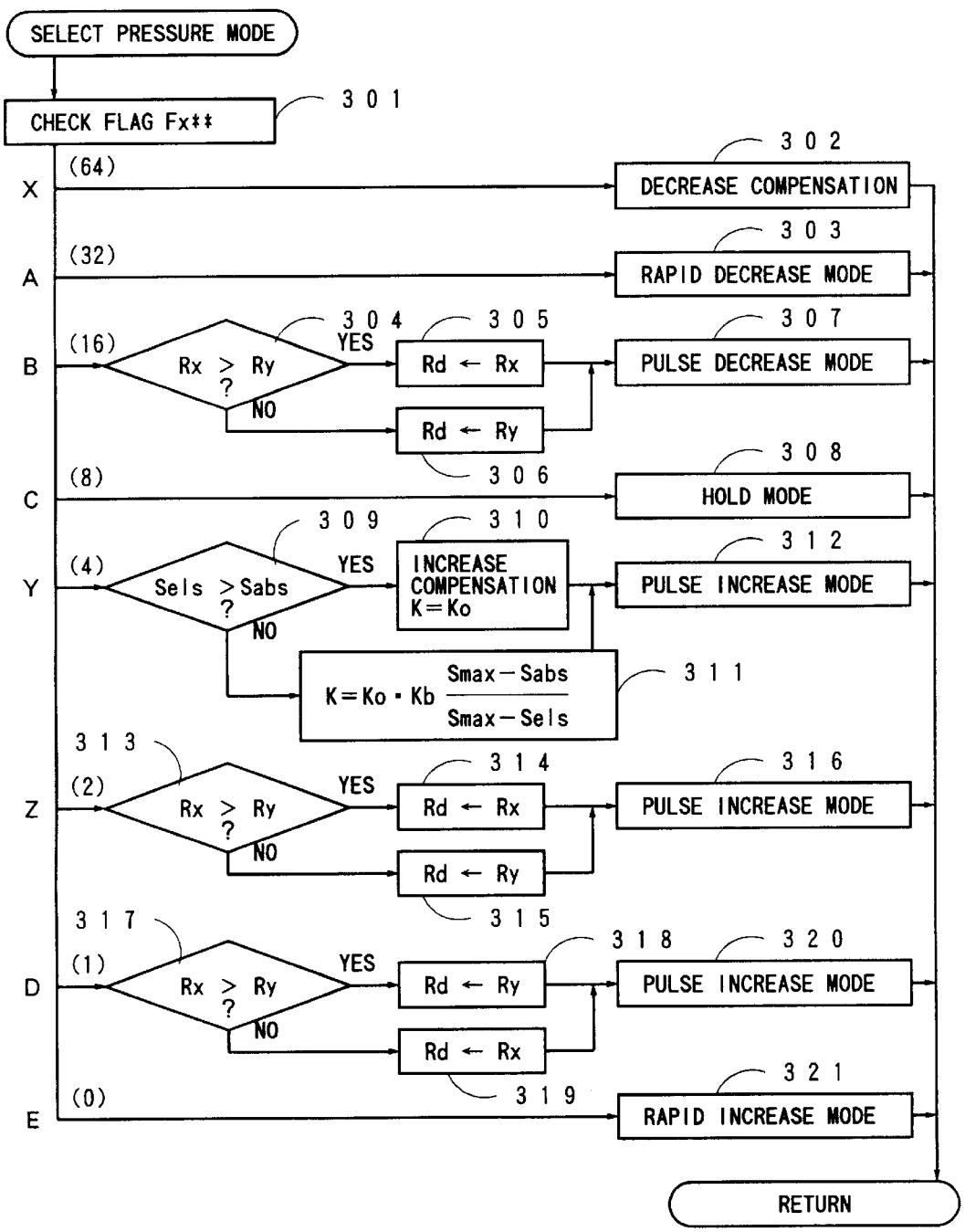
FIG. 7 is a flowchart showing a sub-routine for comparing the control modes according to the above embodiment of the present invention.

FIG. 7 shows the selection of the pressure modes executed at Step 121 as shown in FIG. 5. At the outset, a control mode flag Fx, which is set for each control mode at Steps 110, 113, 116 and 118, is checked at Step 301. "x" in the flag Fx represents a variation of the control mode, "" represents the wheel to be controlled. The flag Fx is indicated by one of 8-bit numbers (0, 1=$2^0$, 2=$2^1$, 4=$2^2$, 8=$2^3$, 16=$2^4$, 32=$2^5$, 64=$2^6$), so that eight kinds of pressure mode can be selected, and its priority is determined by the numbers. When plural control flags Fx are set simultaneously, therefore, the control flag having the larger number is selected. If the number of the control flag Fx is "64", for example, the pressure decrease compensating mode is performed at first. "A" to "E" as shown in FIG. 7 indicates a principle order for operating the pressure modes, while "X" to "Z" indicates an exceptional order.

According to the principle order, when the control mode flag Fx is "32", "A" is selected, so that the pressure mode is set to the rapid decrease mode at Step 303. If the control mode flag Fx is "16", it is set to the pulse decrease mode (gradually decreasing the pressure) at Steps 305–307. In this case, the plural control mode flags Fx are set in accordance with the plural control modes simultaneously, so that when all of the control flags are "16" thereby to set the pulse decrease mode, the pulse decrease mode having a duty ratio with the largest gradient of the pressure decrease is selected at first. In practice, a duty ratio Rx which is set when the pressure decrease is performed in a certain control mode, is compared with a duty ratio Ry which is set when the pressure decrease is performed in another control mode. If the former is larger than the latter, a duty ratio Rd for the pressure mode to be selected is set to "Rx" at Step 305. Whereas, if the duty ratio Rx is equal to or smaller than the duty ratio Ry, the duty ratio Rd for the pressure mode to be selected is set to "Ry" at Step 306**.

When the control mode flag Fx is "8", the pressure mode is set to a hold mode at Step 308. Then, if the control mode flag Fx is "1", the pulse pressure increase mode is set at Steps 317–320. In this case, the plural control mode flags Fx are set in accordance with the plural control modes simultaneously, so that when all of the control flags are "1" thereby to set the pulse increase mode, the pulse increase mode having a duty ratio with the smallest gradient of the pressure increase is selected at first. In practice, the duty ratio Rx which is set when the pressure increase is performed in a certain control mode, is compared with the duty ratio Ry which is set when the pressure increase is performed in another control mode. If the former is larger than the latter, the duty ratio Rd for the pressure mode to be selected is set to "Ry" at Step 318. Whereas, if the duty ratio Rx is equal to or smaller than the duty ratio Ry, the duty ratio Rd for the pressure mode to be selected is set to "Rx" at Step 319. And, when the control mode flag Fx is "0", the pressure mode is set to the rapid pressure increase mode.

Thus, when the plural control modes are set simultaneously and the pressure mode is set in accordance with each control mode, the pulse decrease mode having the larger duty ratio is selected, so that the wheel cylinder pressure tends to be decreased. For example, when the steering control by braking is being performed according to the control map with the origin (S1, G1), if the tip of the control index reaches a point "M" in FIG. 14, it is fallen within the zone RD of the rapid decrease mode on the control map for the steering control by braking, while it is also fallen within the zone RI of the rapid increase mode on the control map for the anti-skid control, at the same time. In the prior art, the anti-skid control was selected to provide the pressure mode according to the control map for the anti-skid control. In this case, therefore, the control index would have converged on its origin (S0, G0), as indicated by a solid line in FIG. 14. In order to converge it to the origin (S1, G1) on the control map for the steering control by braking, it would take much time to do so, whereby the operation of the steering control by braking would be delayed. According to the present invention, however, "E" in FIG. 7 prevails "A" in FIG. 7, so that the rapid decrease mode is set at Step 303. Therefore, it will immediately converge to the origin (S1, G1), as shown by the broken line in FIG. 14.

On the other hand, "X" to "Z" in FIG. 7 relate to the control modes dependent from the anti-skid control mode, so that they are exceptional to the order of the modes as indicated by "A" to "E". That is, if the control mode flag Fx** is "64", the pressure decrease compensation mode is set, whereby the pressure to be decreased will be modified so as to prevent an excessive decrease of the braking force, or an excessive increase or change of the cornering force, which may be caused by an excessive amount of pressure decrease which will occur in the pressure decrease mode for the anti-skid control.

When the control mode flag Fx is "4", the pressure increase compensation mode is set. That is, with respect to the pressure increase control which is performed after the pressure decrease mode for the anti-skid control, the pressure increase compensation mode for increasing the pressure in response to the total amount of pressure decreased by that time. For example, the amount of pressure to be increased is modified on the basis of the total time of pressure decrease operation performed by the end of the previous cycle, wheel acceleration, coefficient of friction and so on. The pressure mode during the pressure increase compensation mode is set to the pulse increase mode. In this case, when the plural control mode flags Fx are set according to the plural control modes simultaneously, and when all of the control flags are "4" thereby to set the pulse increase mode, a desired slip rate (Sabs) for the anti-skid control mode is compared with a desired slip rate (Sels) for any one of the control modes other than the anti-skid control mode, at Step 309. If it is determined that the desired slip rate (Sels) is larger than the slip rate (Sabs), amount of pressure increase compensation (K) is set to "K0" at Step 310. Whereas, if the desired slip rate (Sels) is equal to or smaller than the desired slip rate (Sabs), the amount of pressure increase compensation (K) is set to K9·Kb (Smax−Sabs)/(Smax−Sels) at step 311, wherein "K0" is a value set on the basis of a total time of the pressure decrease operation performed before the pressure increase compensation is initiated, the coefficient of friction and so on, and wherein "Kb" is a bias value, e.g., "1" in this embodiment.

If the control mode flag is "2", the pulse pressure increase mode is set at Steps 313–316. In this case, the plural control mode flags Fx are set in accordance with the plural control modes simultaneously, and all of the control flags are "2" thereby to set the pulse increase mode, the pulse increase mode having a duty ratio with the largest gradient of the pressure increase is selected at first. In practice, the duty ratio Rx which is set when the pressure increase is performed in a certain control mode, is compared with the duty ratio Ry which is set when the pressure increase is performed in another control mode. If the former is larger than the latter, the duty ratio Rd for the pressure mode to be selected is set to "Rx" at Step 315. Whereas, if the duty ratio Rx is equal to or smaller than the duty ratio Ry, the duty ratio Rd for the pressure mode to be selected is set to "Ry" at Step 315. It is preferable that the hold mode is selected for one cycle immediately after the duty ratio Rd was set in accordance with the result determined at Steps 304, 313, 317**.

The distribution control, the traction control by braking, and the steering control by braking are performed in a similar fashion to the control as described above. FIG. 15 shows another example of a map including the reference map and control map for use in controlling not only the braking force but also a driving force. With that map, the present invention is applicable to the traction control, as well. Thus, the present invention is applicable to the entire vehicle motion control including the braking force control and the driving force control, thereby to perform a desired vehicle motion control smoothly.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle is in motion, by controlling a braking force applied to each wheel of said vehicle, comprising:

wheel speed detection means for detecting a wheel speed of each wheel of said vehicle;

wheel acceleration calculating means for calculating a wheel acceleration of each wheel on the basis of the wheel speed detected by said wheel speed detection means, respectively;

slip rate calculating means for calculating an actual slip rate of each wheel on the basis of the wheel speed detected by said wheel speed detection means, respectively;

vehicle condition monitor means for monitoring a condition of said vehicle in motion;

hydraulic braking pressure control apparatus for controlling a hydraulic braking pressure in a wheel cylinder operatively mounted on each wheel for applying braking force thereto, in accordance with a pressure mode selected from plural pressure modes including a pressure increase mode and a pressure decrease mode;

desired slip rate setting means for setting a desired slip rate for each wheel in accordance with a control mode which is selected from plural control modes on the basis of the vehicle condition monitored by said vehicle condition monitor means;

slip rate deviation calculating means for calculating a deviation between the desired slip rate and the actual slip rate to obtain a slip rate deviation;

vehicle acceleration detection means for detecting a vehicle acceleration of said vehicle;

vehicle acceleration deviation calculating means for calculating a deviation between the vehicle acceleration and the wheel acceleration for each wheel to obtain a vehicle acceleration deviation, respectively;

control map setting means for setting plural control maps with an x-axis of the slip rate deviation and a y-axis of the vehicle acceleration deviation, respectively, each control map having an origin determined by the desired slip rate and the vehicle acceleration provided for each control mode;

pressure mode setting means for setting a pressure mode for said pressure control apparatus in each control mode, said pressure mode being set according to a location determined by the slip rate deviation and the vehicle acceleration deviation on said control map;

pressure mode selection means for selecting one of the plural pressure modes, each of which is set in each control mode, according to a predetermined priority, when the plural control modes are set simultaneously for each wheel and the pressure mode is set in each control mode, said pressure control apparatus controlling the hydraulic pressure in said wheel cylinder in accordance with the selected pressure mode.

2. A vehicle motion control system as set forth in claim 1, wherein said vehicle acceleration detection means includes vehicle acceleration calculating means for calculating an estimated vehicle acceleration on the basis of the wheel acceleration for each wheel calculated by said wheel acceleration calculation means, said vehicle acceleration deviation calculating means calculating a deviation between the estimated vehicle acceleration and the wheel acceleration for each wheel to obtain the vehicle acceleration deviation, and said control map setting means setting said control maps, each of which has the origin determined by the desired slip rate and the estimated vehicle acceleration provided for each control mode.

3. A vehicle motion control system as set forth in claim 1, wherein said control map setting means is adapted to set said control maps, each of which has a reference line including each origin, and has plural lines in parallel with the reference line to divide the plane of said control map into plural zones for providing the plural pressure modes.

4. A vehicle motion control system as set forth in claim 3, wherein said control map setting means is adapted to set said plural control maps, each of which has the origin shifted to provide a neutral zone.

5. A vehicle motion control system as set forth in claim 3, wherein said control map setting means is adapted to set said control maps, each of which has a control index provided perpendicularly to the reference line, and wherein said pressure mode selection means is adapted to select each of said pressure modes according to the zone where the tip of said control index locates.

6. A vehicle motion control system as set forth in claim 1, wherein said predetermined priority includes a principle priority, according to which one of the plural pressure modes for providing the decreasing gradient of the hydraulic pressure in said wheel cylinder larger than the decreasing gradients provided by the rest of the pressure modes, is selected at first.

7. A vehicle motion control system as set forth in claim 6, wherein said predetermined priority further includes an exceptional priority, according to which a pressure mode for compensating the pressure in said wheel cylinder decreased in accordance with the anti-skid control mode is selected at first.

* * * * *